3,135,616
REFRACTORY
Charles L. Norton, Jr., New York, N.Y., assignor to The Babcock & Wilcox Company, New York, N.Y., a corporation of New Jersey
No Drawing. Filed Apr. 28, 1961, Ser. No. 106,176
3 Claims. (Cl. 106—65)

This invention relates to the manufacture of fired refractory shapes for service use in contact with liquid slags and more particularly to refractories adapted for use in contact with a body or stream of molten glass.

The object of the invention is to provide an improved refractory composition having high corrosion resistance to molten slags, as well as a high resistance to thermal shock. As an example, because of the high corrosion and heat shock resistance of the composition of this invention, the composition has particular utility for refractory parts for guiding and controlling the flow of molten glass in the production of glass containers such as bottles, jars and the like. For economical operation it is important that in addition to having a low rate of corrosion by contact with the molten glass, such refractories should have the capability of being introduced when at room temperature directly into a high temperature furnace without cracking or breaking. Materials which do not have the necessary heat shock resistance when introduced into such a furnace glass require a slow preheating in a separate furnace before introducing them into the working furnace. This additional heating operation adds to the overall cost of the glass-making operation.

In melting furnaces for the manufacture of the normal grades of container glass, a refractory composition consisting almost wholly of aluminum oxide in the form of corundum having a grain structure throughout of identical chemical and physical characteristics other than grain size, such as a composition composed entirely of sized Tabular corundum grains and a binder, has proved to be highly resistant to corrosion by molten glass. Such compositions, however, have very low thermal shock resistance, and require preheating before placing in a glass-melting furnace. The low heat shock resistance is believed due to the fact that the corundum grains being normally of identical chemical and physical characteristics, aside from grain size, provide a refractory body having a continuous texture which permits the rapid transmission of cracks throughout the body when once started.

It is known in the manufacture of ceramic kiln furniture that by using a refractory composition consisting of Tabular corundum and mullite grains with a binder, good heat shock resistance can be obtained. A composition of this type is disclosed in U.S. Patent No. 2,895,840 issued to C. D. Ortman. However, experience shows that such compositions, when used to form a refractory article for guiding and controlling the flow of molten glass, possess a rather short useful life, for the reason that the use of mullite with corundum sacrifices corrosion resistance compared to a composition containing substantially all corundum owing to the fact that the mullite crystals dissolve in molten glass more rapidly than corundum.

I have discovered that a refractory composition, particularly adapted for contact with molten glass and having greatly improved corrosion resistance, as well as a heat shock resistance at least equivalent to compositions now employed, can be made by using a sintered alumina-silica material of such proportions of alumina and silica as to result in a sintered product having an alumina content in the range of 80–95% by weight, in a sized grain in an amount constituting 10–50% by weight of the refractory composition, with the remaining portion of the composition consisting of sized corundum grain and a suitable binder, such as bonding clay. An alumina-silica material having an alumina content in this range will not develop mullite crystals upon sintering, but will form predominantly corundum crystals, and when crushed to a sized grain and combined with the corundum grain and binder constituents of the composition will result in a finished refractory composition having far superior corrosion resistance than would be the case if the composition contained mullite crystals. In addition, laboratory and field tests show that the thermal shock resistance of the composition of the invention is at least equivalent to that of the more corrodible compositions now in use. The exact reason for the high heat shock resistance property of the composition is not known, but it is believed that a mixture of two types of somewhat dissimilar grains, represented by the corundum and alumina-silica constituents of the composition, do not form a uniform continuous texture after heat treatment, and the resulting interrupted structure minimizes the transmission of cracks. In sintering the alumina-silica material of the composition, the sintering temperature should be low enough to prevent fusion, yet high enough so that the density and strength of the material will be sufficient to provide the required grain size fractions upon crushing. For example, I have achieved excellent results by sintering the alumina-silica material at a temperature of about 3000° F., at which the bulk specific gravity of the sintered material will be about 3.30.

Thus, in accordance with my invention, the foregoing objects are achieved by a composition consisting substantially entirely of 10–50% by weight of a sintered alumina-silica sized grain having an alumina content in the range of 80–95% by weight, 4–12% by weight of a suitable bonding material, and the remainder of sized corundum grain. I have determined that the prescribed amounts of sintered alumina-silica grain and of the alumina content of such grain are critical and not only provide a composition having excellent heat shock resistance, but also afford a corrosion resistance far exceeding that of prior compositions intended for similar service. Below and above the specified alumina-silica grain range, the heat shock resistance of the composition rapidly decreases. Below the specified alumina content of the sintered alumina-silica grain, the corrosion resistance of such compositions has been found to drop off sharply because mullite crystals would be the predominant phase present, which condition would be undesirable because of the high rate of corrosion of mullite crystals compared to the corundum crystals of the composition. With alumina constituting 80–95% by weight of the content of the sintered alumina-silica grain, no mullite crystals can be identified and corundum is the only readily identifiable constituent. Above the specified alumina range in the sintered alumina-silica material, the alumina crystals approach the form of corundum and the dissimilarity of the grains becomes less, hence the shock resistance of the composition deteriorates rapidly.

Because the effective life of the refractory, after it has been placed in a glass-melting furnace, for example, depends on its rate of corrosion, it is important for the refractory to have low porosity so that the surface area exposed to molten glass will be small. This is accomplished by using a controlled grain sizing of coarse, medium and fine fractions. Much work has been done on the subject of size fractions to give dense packing, and this work is well known to those skilled in the art.

A preferred refractory composition made in accordance with my invention has the following proportions:

| | Parts by weight |
|---|---|
| Tabular corundum—⅛″ to ¼″ | 15 |
| Tabular corundum—14 mesh | 25 |
| Tabular corundum—2% on 325 mesh screen | 7 |
| Corundum (calcined alumina)—.3% to .5% on 325 mesh screen | 15 |
| Synthetic alumina-silica grain having an alumina content of 88%: | |
| ⅛″ to ¼″ grain | 15 |
| 14 mesh | 15 |
| Clay | 8 |
| Sodium phosphate (only used when casting, as a deflocculant) | .1 |

Other suitable compositions made in accordance with the invention are as follows:

| | Parts by weight |
|---|---|
| Tabular corundum—⅛″ to ¼″ | 19 |
| Tabular corundum—14 mesh | 32 |
| Tabular corundum—2% on 325 mesh screen | 9 |
| Corundum (calcined alumina)—.3% to .5% on 325 mesh screen | 15 |
| Synthetic alumina-silica grain having an alumina content of 88%: | |
| ⅛″ to ¼″ grain | 8.5 |
| 14 mesh | 8.5 |
| Clay | 8 |
| Sodium phosphate (only used when casting, as a deflocculant) | .1 |

| | Parts by weight |
|---|---|
| Tabular corundum—⅛″ to ¼″ | 10 |
| Tabular corundum—14 mesh | 17 |
| Tabular corundum—2% on 325 mesh screen | 5 |
| Corundum (calcined alumina)—.3% to .5% on 325 mesh screen | 15 |
| Synthetic alumina-silica grain having an alumina content of 88%: | |
| ⅛″ to ¼″ grain | 22.5 |
| 14 mesh | 22.5 |
| Clay | 8 |
| Sodium phosphate (only used when casting, as a deflocculant) | .1 |

Although the compositions listed above involve the use of a clay binder, it is well known that refractory bodies can be produced without clay binders by increasing the quantity of fines, and by adjusting the pH value of the mix by using phosphate, carbonate or the like. Such bodies can be formed by pressing, casting or extruding in a manner similar to bodies containing clay. Also, it is preferred that the corundum be in the form known as "Tabular corundum," presently available on the market from the Aluminum Company of America. In addition, sintered South American bauxite may be substituted for the synthetic alumina-silica mix since the alumina-silica content of such bauxite meets the requirements of a composition formed in accordance with the invention.

The refractory composition of the invention can be formed into the required shapes by well-known forming methods. One such method is casting, that is, forming without applied pressure a fluid mixture into plaster molds. Alternatively, forming by mechanical pressing or hand ramming may be used. After forming, the refractory shape or part is dried to the desired degree, placed in a suitable kiln or furnace and fired to a temperature suitable to provide a strong, hard, finished refractory product. The exact maximum firing temperature will depend on the specific composition and, for example, may range between 2400° F. and 2900° F.

While in accordance with the provisions of the statutes I have disclosed herein the best embodiment of the invention now known to me, those skilled in the art will understand that changes may be made without departing from the spirit of the invention covered by my claims.

What is claimed is:

1. A fired refractory article for contact with molten glass having high thermal shock and corrosion resistance properties and formed by firing a refractory composition consisting of 10–50% by weight of an alumina-silica grain in graded sizes to produce low porosity having an alumina content in the range of 80–95% by weight, 4–12% by weight of bonding clay, and the remainder corundum grain in graded sizes to produce low porosity.

2. A fired refractory article for contact with molten glass having high thermal shock and corrosion resistance properties and formed by firing a refractory composition consisting of 10–50% by weight of a sintered alumina-silica grain in graded sizes to produce low porosity having an alumina content in the range of 80–95% by weight, and the remainder corundum grain in graded sizes to produce low porosity.

3. A fired refractory article for contact with molten glass having high thermal shock and corrosion resistance properties and formed by firing a refractory composition consisting of:

| | Parts by weight |
|---|---|
| Corundum—⅛″ to ¼″ grain | About 15 |
| Corundum—14 mesh | About 25 |
| Corundum—2% on 325 mesh screen | About 7 |
| Corundum—.3% to .5% on 325 mesh screen | About 15 |
| Alumina-silica grain having alumina content of content of 88%: | |
| ⅛″ to ¼″ grain | About 15 |
| 14 mesh | About 15 |
| Clay | About 8 |

References Cited in the file of this patent

UNITED STATES PATENTS 2,895,840    Ortman    July 21, 1959